United States Patent [19]

Hachinoda

[11] Patent Number: 5,282,242
[45] Date of Patent: Jan. 25, 1994

[54] FACSIMILE APPARATUS
[75] Inventor: Masayuki Hachinoda, Nara, Japan
[73] Assignee: Sharp Kabushiki Kaisha, Osaka, Japan
[21] Appl. No.: 71,367
[22] Filed: Jun. 3, 1993

Related U.S. Application Data

[63] Continuation of Ser. No. 745,076, Aug. 15, 1991, abandoned.

[30] Foreign Application Priority Data

Aug. 24, 1990 [JP] Japan ................... 2-223371
Aug. 24, 1990 [JP] Japan ................... 2-223372

[51] Int. Cl.⁵ .................... H04M 1/64; H04M 11/00
[52] U.S. Cl. .................................. 379/100; 379/88; 379/89; 358/434; 358/468
[58] Field of Search .................. 379/100, 93, 94, 96, 379/97, 98, 67, 89; 358/434, 445, 465, 406, 468, 405

[56] References Cited

U.S. PATENT DOCUMENTS

| | | | |
|---|---|---|---|
| 4,829,559 | 5/1989 | Izawa et al. | 379/97 |
| 4,847,891 | 7/1989 | Kotani | 379/100 |
| 4,914,687 | 4/1990 | Maeda | 379/100 |
| 4,916,607 | 4/1990 | Teraichi et al. | 379/100 |
| 4,951,156 | 8/1990 | Kotani et al. | 358/434 |
| 4,956,860 | 9/1990 | Murata | 379/100 |
| 5,022,071 | 6/1991 | Mozer et al. | |
| 5,138,654 | 8/1992 | Yuki | 379/100 |

FOREIGN PATENT DOCUMENTS

| | | |
|---|---|---|
| 0333123 | 3/1989 | European Pat. Off. |
| 56-28068 | 6/1981 | Japan . |
| 61-26260 | 6/1986 | Japan . |
| 64-86663 | 3/1989 | Japan . |
| 2231757 | 4/1990 | United Kingdom . |

OTHER PUBLICATIONS

EPO Search Report, Vienna, Nov. 9, 1992 and Annex thereto.

Primary Examiner—Jin F. Ng
Assistant Examiner—Jason Chan
Attorney, Agent, or Firm—Nixon & Vanderhye

[57] ABSTRACT

A facsimile apparatus (1) is provided with a function of making a facsimile communication through a telephone line (2). The facsimile apparatus includes: a memory device (8) for storing information to indicate a condition related to the facsimile communication; a voice data storing device (15) for storing predetermined various kinds of voice data; a speech signal synthesizing device (16) for synthesizing a speech signal on a basis of the stored information and the stored voice data; and a transmitting device (3) for transmitting the synthesized speech signal onto the telephone line (FIG. 1).

7 Claims, 6 Drawing Sheets

| ADDRESS | DATA |
|---------|------|
| AD 1    | P 1  |
| AD 2    | P 2  |
| ⋮       | ⋮    |
| AD n    | P n  |
| ⋮       | ⋮    |

| ADDRESS | DATA |
|---------|------|
| AD 1    |      |
| ⋮       | ⋮    |
| AD i    | D L  |
| ⋮       | ⋮    |

FACSIMILE APPARATUS

This is a continuation of application Ser. No. 07/745,076, filed Aug. 15, 1991, now abandoned.

BACKGROUND OF THE INVENTION

1. Field of the Invention

The present invention relates to a facsimile apparatus.

2. Description of the Related Arts

In a facsimile apparatus, a plurality of operation parameters are set and stored in an internal memory device of the facsimile apparatus. Here, the operation parameter is a numerical value indicating various kinds of operation modes and operation conditions of the facsimile apparatus. For example, such operation parameters includes a parameter indicating a transmitting level of the image data, a parameter indicating a receiving level of the image data, and a parameter indicating various kinds of image quality modes such as a standard mode, and a fine mode which is to be selected in case that the characters of the original to be transmitted by the facsimile operation are fine or small when they are read.

In this kind of facsimile apparatus, the above-mentioned operation parameters are displayed or printed out by means of a display device or a printing device equipped in the facsimile apparatus, so that the user can be aware of the operation parameters currently set in the facsimile apparatus.

In the above-mentioned facsimile apparatus, however, the operation parameters can be displayed or printed out only at the site of the user using the pertinent facsimile apparatus. In other words, the operation parameters cannot be known at the site of the opponent party i.e. the other facsimile apparatus, with which the facsimile communication is to be established. Accordingly, the facsimile communication may fail or result in a very poor image transmission because the operation conditions or the operation modes of the two facsimile apparatuses are not matched or relatively properly set, which is the great problem of this kind of facsimile apparatus.

To overcome this problem, it may be proposed that the operation parameters are coded and transmitted to the opponent party along with the ordinary facsimile communication. However in this case, the structure of the facsimile apparatuses and the manner of the communication would be quite complicated.

As the information to indicate the operation condition of the facsimile apparatuses communicated with each other, the information as for the receiving level of the image data at the facsimile apparatus on the receiving side, is especially important from a view point of the outputted image quality on the receiving side. Thus, there is a facsimile apparatus which has a function to detect the receiving level of the image data, and displays or prints out the detected receiving level on the display or by the printer, so that the user at the receiving side can be aware of the receiving level. However in this case, since the display or print-out of the receiving level of the image is performed only at the facsimile apparatus on the receiving side, the user at the transmitting side has to call up the opponent party after the facsimile transmission and ask the opponent party about the receiving level, in order to check the receiving level of the image at the receiving side.

SUMMARY OF THE INVENTION

It is therefore an object of the present invention to provide a facsimile apparatus, in which the information indicating the operation condition of the facsimile apparatus, such as operation parameters and the receiving level of the image data, can be transmitted to the opponent party after receiving the image data such that the opponent party can easily understand the transmitted information.

According to the present invention, the above mentioned object can be achieved by a facsimile apparatus provided with a function of making a facsimile communication through a telephone line. The facsimile apparatus includes: a memory device for storing information to indicate a condition related to the facsimile communication; a voice data storing device for storing predetermined various kinds of voice data; a speech signal synthesizing device for synthesizing a speech signal on a basis of the stored information and the stored voice data; a communication control device for calling a communication device after having received image data and a transmitting device for transmitting the synthesized speech signal onto the telephone line if the communication device responds to the call within a predetermined period.

In the facsimile apparatus, the memory device stores information to indicate a condition related to the facsimile communication, such as the transmitting condition i.e. the transmission level of the image data, the transmitting ratio etc., the operation mode and the receiving level of the image data. On the other hand, the voice data storing device stores predetermined various kinds of voice data. In the operation of facsimile communication, the speech signal synthesizing device synthesizes a speech signal on a basis of the information stored in the memory device and the voice data stored in the voice data storing device. Then, the transmitting device transmits this synthesized speech signal onto the telephone line.

Consequently, the user can make a telephone call from any telephone to the present facsimile apparatus, and can check the condition of the present facsimile apparatus prior to starting a facsimile communication i.e. transmitting image data from another facsimile apparatus at the vicinity of this user, by supplying a password signal indicating a telephone communication rather than a facsimile communication and then just listening to the voice corresponding to the speech signal on the telephone. Then, it is possible for the user to adjust the condition of his facsimile apparatus, i.e. the transmitting level, the transmitting ratio, the operation mode etc., so as to harmonize them with those of the present facsimile apparatus. Accordingly, the generation of the transmission error of the image data can be effectively prevented by the present invention, and thus the reliability of the facsimile communication is drastically increased.

The user can also make a telephone call to the present facsimile apparatus after finishing the facsimile communication, and can check the transmitting condition such as the receiving level of the image data which has been just transmitted to the present facsimile apparatus, by just listening to the voice corresponding to the speech signal on the telephone. Accordingly, if the noise level is high and thus the receiving condition of the image data at the present facsimile apparatus (receiving side), is bad, still the user can increase the output level of the image data so as to improve the S/N ratio, and the facsimile transmission can be tried again and continued with this increased appropriate output level.

Further objects and advantages of the present invention will be apparent from the following description of the preferred embodiment of the invention as illustrated in the accompanying drawings.

DETAILED DESCRIPTION OF THE PREFERRED EMBODIMENT

A preferred embodiment of the present invention will be described below with reference to the accompanying drawings.

Figure 1:
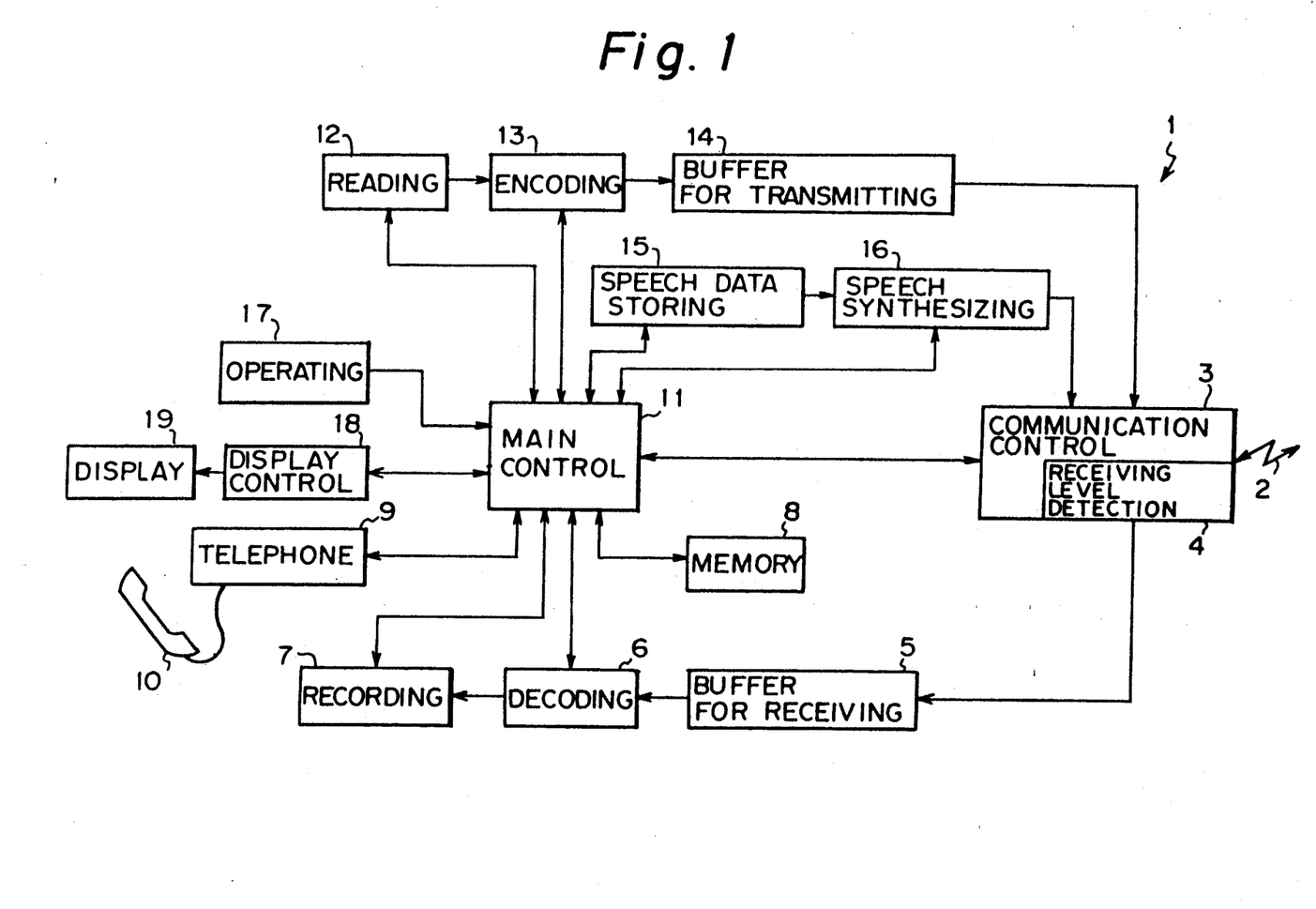
FIG. 1 is a block diagram of a facsimile apparatus as an embodiment of the present invention.

In FIG. 1, the reference number 1 designates a facsimile apparatus, which performs transmitting and receiving operations of voice signal and image data by use of a telephone line 2.

The facsimile apparatus 1 is provided with a communication control device 3. The communication control device 3 is connected to the telephone line 2 and includes a NCU (Network Control Unit), a modem, a CML (Connect Modem to Line) relay, and a calling signal detection circuit, so as to control the connecting and disconnecting operations of the telephone line 2 with the opponent party, and also control the transmitting and receiving operations of the image data and voice signal. The communication control device 3 further includes a receiving level detection device 4, which detects the receiving level of the image data received through the telephone line 2.

The facsimile apparatus 1 is also provided with a buffer 5 for receiving the image data, a decoding device 6, a recording device 7, a memory 8, a telephone device 9, a handset 10 and a main control device 11. The image data received by the communication control device 3 is given to the decoding device 6 via the buffer 5. The buffer 5 is adapted to adjust the receiving ratio of the image data at the communication control device 3 and the decoding ratio of the image data at the decoding device 6. The decoding device 6 performs the decoding operation of the received image data. For example, the decoding device 6 performs such a decoding operation as to convert a run length coded image data to the image data in the original format. This decoded image data is given to the recording device 7.

The recording device 7 may consist of a thermal printer, for example, in which a thermal head and a platen roller are equipped so as to print the given image data onto a temperature sensitive recording sheet by selectively heating a plurality of resister heating elements in the thermal head in its recording operation. Alternatively, the recording device 7 may consist of other type of printer device such as a laser beam printer, an ink jet printer and so on.

The decoding device 6 and the recording device 7 are synchronously controlled by control signals and clock signals outputted from the main control device 11. The main control device 11 preferably consists of a microcomputer, which is adapted to control the overall operation in the facsimile apparatus 1 in such a manner as to be described later in detail, on a basis of a predetermined program. The image data may be given and stored into the memory 8 from the decoding device 6 through the main control device 11 when receiving the image data, instead of directly recording by the recording device 7.

The voice signal received by the communication control device 3 is given to the telephone device 9 through the main control device 11. The telephone device 9 is connected to the handset 10 which is equipped with a speaker and a microphone to enable the voice communication. The received voice signal is outputted from the speaker of the handset 10. The voice signal inputted at the microphone of the handset 10 is given to the communication control device 3 through the telephone device 9 and the main control device 11, and is transmitted from the communication control device 3 to the opponent party by the telephone line 2. Accordingly, the facsimile apparatus 1 is adapted to perform a voice communicating operation as well as the facsimile communicating operation i.e. the image signal transmitting and receiving operations.

The facsimile apparatus 1 is also equipped with an image reading device 12, an encoding device 13, a buffer 14 for transmitting, a speech data storing device 15, and a speech synthesizing device 16. The main control device 11 is adapted to control the reading device 12 and the encoding device 13 to read the image of an original to be transmitted and encode the read image data. The reading device 12 may includes a CCD (Charged Coupled Device) image sensor and a light source, so as to illuminate the original by the light source, receive the reflected light from the original and convert it to electrical signal i.e. image data by the CCD image sensor, and give it to the encoding device 13.

The encoding device 13 converts the image data into the run length coded form, and gives it to the communication control device 3 via the buffer 14. The buffer 14 is adapted to adjust the encoding ratio of the image data at the encoding device 13 and the transmitting ratio of the image data at the communication control device 3. The reading device 12 and the encoding device 13 are synchronously controlled by the control signal and the clock signal outputted from the main control device 11.

The main control device 11 is adapted to control the speech data storing device 15 and the speech synthesizing device 16 to synthesize the speech signal and transmit it from the communication control device 3. The speech data storing device 15 stores various kinds of speech data corresponding to predetermined speeches in a human voice, for example, speech data corresponding to sentences such as "the transmitting level is", "the transmitting ratio is" etc., speech data corresponding to numbers 0 to 9 such as "one" to "nine", speech data corresponding to alphabet A to F such as "ei" to "ef" and so on. The speech synthesizing device 16 synthesizes the speech signal on a basis of the data indicating each operation parameter stored in the memory 8 and the speech data stored in the speech data storing device 15.

The facsimile apparatus 1 is also equipped with an operating device 17, a display control device 18 and a display device 19. The display device 19 is connected to the main control device 11 through the display control device 18. The operating device 17 may includes ten key switches, control buttons etc., which are operated by the user when the facsimile operation i.e. the transmitting or receiving operation of the image data is to be performed, when the original is to be read or copied, when the voice communication is to be established, when the compacted form dial number is to be registered, when the operation mode is to be set to the facsimile apparatus 1, and so on.

The display device 19 may include a LCD (Liquid Crystal Display) device, an EL (Electroluminescence) display device, a plurality of lamps etc., so as to display the operation mode of the facsimile apparatus 1, the inputted telephone number, the operation parameters set in the facsimile apparatus 1, and so on.

Figure 2:
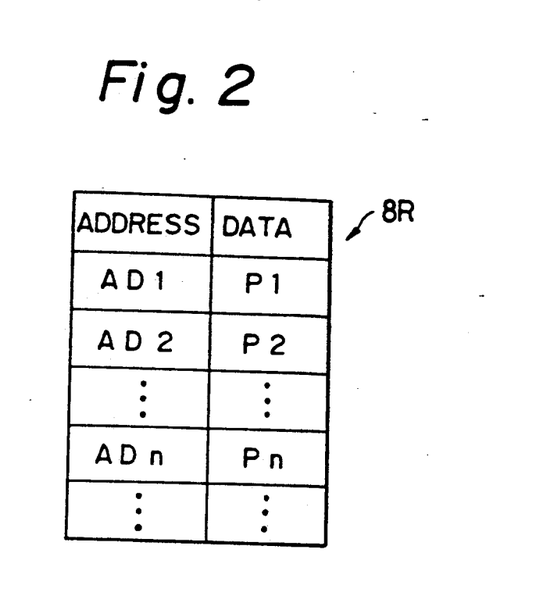
FIG. 2 is a schematic view showing a data structure in the memory of the facsimile apparatus of FIG. 1.

FIG. 2 shows a data structure of the stored content of a parameter storing region 8R which is set in the memory 8 of FIG. 1. In the parameter storing region 8R, addresses AD1 to ADn are set, while parameters P1 to Pn indicating operating condition of the facsimile apparatus 1, are stored in correspondence with these addresses.

Figure 3:
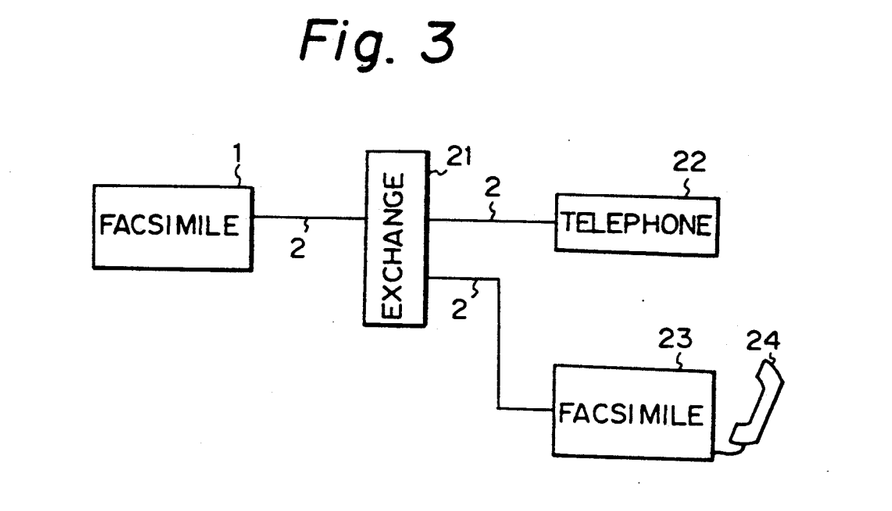
FIG. 3 is a schematic view to explain an operation of the facsimile apparatus of FIG. 1.

FIG. 3 is a schematic view to explain the basic operations of the facsimile apparatus 1. In FIG. 3, on one hand, the facsimile apparatus 1 is connected with a telephone exchange 21 by the telephone line 2. On the other hand, a telephone 22 and another facsimile apparatus 23 are also connected with the telephone exchange 21 by the telephone line 2. Telephone numbers are assigned for the facsimile apparatus 1, telephone 22 and the apparatus 23, respectively, so that, when a calling up side gives to the telephone exchange 21 a telephone number for a called up side, the telephone exchange 21 establishes the telephone line communication between the calling up side and the called up side.

In order to know the operating condition of the facsimile apparatus 1, i.e. the parameters set in the memory of the facsimile apparatus 1, the user calls up the facsimile apparatus 1 from the telephone 22. Then, the facsimile apparatus 1 outputs the speech signal indicating the set parameter according to the procedure described later. By this outputted speech signal, the user of the telephone 22, can know the operating condition of the facsimile apparatus 1 by listening to the speech signal in a form of synthesized human voice.

In case of using a telephone 24 equipped in the apparatus 23, in the same manner as the above-mentioned case of the telephone 22, the user of the facsimile apparatus 1 can know the condition of the facsimile apparatus 1 i.e. the parameters thereof by listening to the speech signal.

Accordingly, the user can appropriately cope with the facsimile communication and effectively prevent errors in the communication. For example, when the user of the apparatus 23 is willing to send an original to the facsimile apparatus 1, the user can start to send the original after matching the facsimile transmitting mode set in the apparatus 23 with the facsimile receiving mode in the facsimile apparatus 1, if these two modes are not presently matched.

The operation of the first embodiment will be explained hereinbelow, with referring to FIG. 1 and FIG. 4, which shows a flowchart of the receiving operation of the facsimile apparatus 1.

Figure 4:
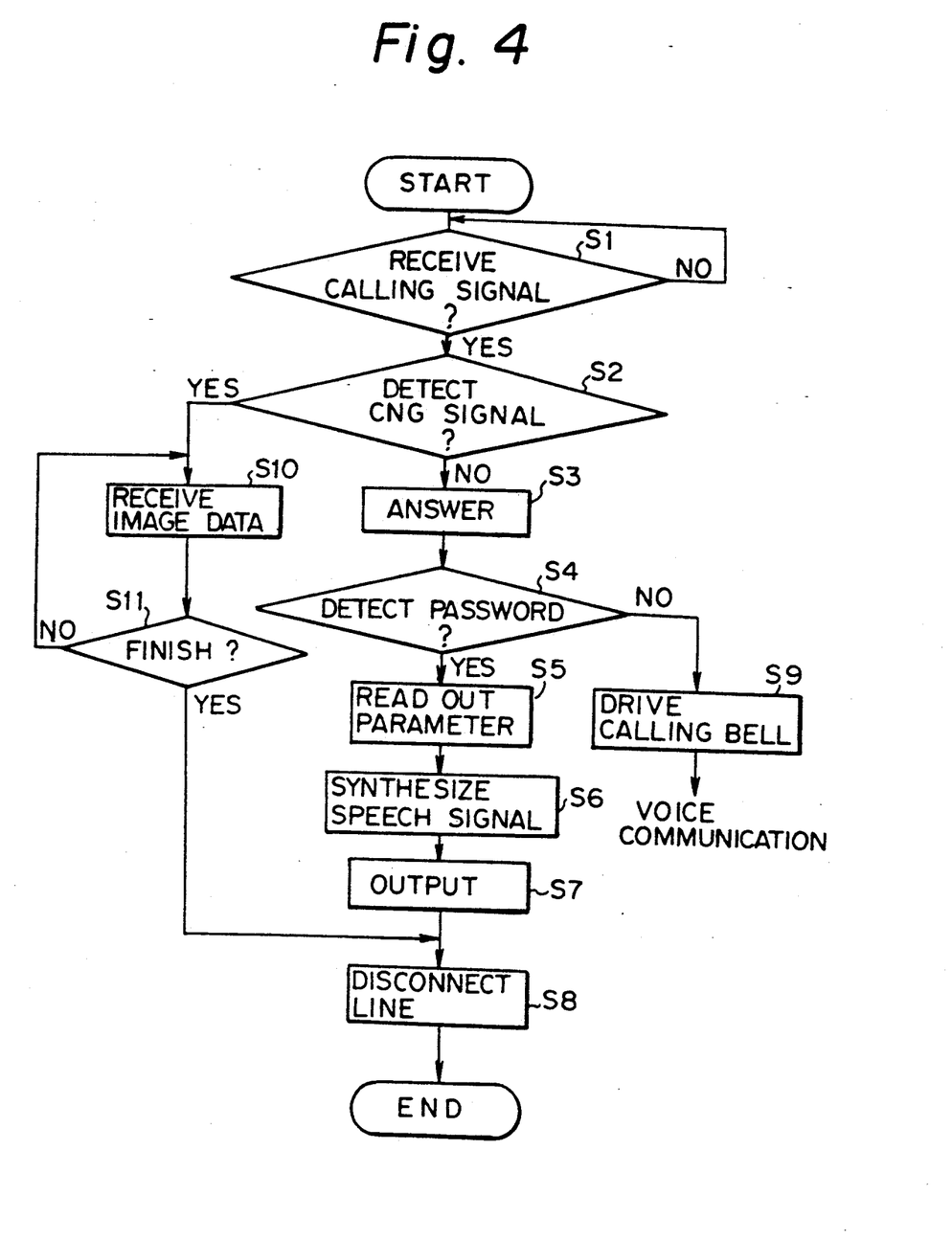
FIG. 4 is a flow chart showing a receiving operation of the facsimile apparatus of FIG. 1.

In FIG. 4, at the step S1, it is judged if the calling signal is received by the communication control device 3 or not, and this judgment is continued. If the calling signal is received (Yes), the flow goes to the step S2. At the step S2, it is judged by the main control device 11 if the CNG signal is detected or not. If the CNG signal is not detected (No), which means that the opponent party request the voice communication, the flow branches to the step S3, and the main control device 11 controls the speech data storing device 15 and the speech synthesizing device 16 to answer the opponent party. For example, at this step S3, a message "Please input the password.", is transmitted from the communication control device 3, as the speech signal, to the opponent party.

Then, at the step S4, it is judged by the main control device 11 if the password is detected or not. If the password is detected (Yes), the flow branches to the step S5. At the step S5, the parameters P1 to Pn are sequentially read out from the parameter storing region 8R of the memory 8, and at the step S6, the speech synthesizing device 16 synthesizes the speech signal indicating the parameters P1 to Pn, by use of the speech data stored in the speech data storing device 15. For example, a speech signal "The parameter P1 is Zero-F, the parameter P2 is A-F, ... ", is synthesized by the speech synthesizing device 16.

Then, at the step S7, the synthesized speech signal is outputted from the speech synthesizing device 16 and then transmitted from the communication control device 3 to the calling up side through the telephone line 2. At the step S8, the communication on the telephone line 2 is disconnected when the transmission of the speech signal is finished, and the receiving operation is ended.

On the other hand, if the password is not detected at the step S4 (No), the flow branches to the step S9. At the step S9, the calling bell of the telephone 9 is driven under the control of the main control device 11 so as to call the user at the side of the facsimile apparatus 1. Then, when the user at the side of the facsimile apparatus 1 responds to this calling bell by picking up the handset 10, the voice communication is established on the telephone line 2.

If the CNG signal is detected at the step S2 (Yes), which means that the opponent party requests to establish the facsimile communication, the flow branches to the step S10. At the step S10, the image data is received. Then, at the step S11, it is judged if the image data reception is finished or not, and this judgment is continued. When the image data reception is finished (Yes), the flow goes to the step S8, and the communication on the telephone line 2 is disconnected.

As described above, according to the present embodiment, the parameters P1 to Pn set in the facsimile apparatus 1 are converted to the speech signal and transmitted onto the telephone line 2. Thus, the operating condition of the facsimile apparatus 1 can be checked from a remote place, such as the site at the telephone 22 or the facsimile apparatus 23 of FIG. 3. Namely, it is possible for the user of the transmitting side to check before transmitting the image data if the operation mode of the facsimile apparatus at the transmitting side corresponds to that at the receiving side or not, and it is further possible to appropriately prepare the facsimile communication, i.e. match the operation mode of the facsimile apparatus at transmitting side to that at the receiving side before transmitting the image data, if necessary. Consequently, according to the present embodiment, the generation of the transmission error on the facsimile transmitting operation can be efficiently avoided, and the reliability of the facsimile apparatus 1 is drastically improved.

The second embodiment of the present invention will be described hereinbelow.

The main construction of the second embodiment is same as the first embodiment of FIG. 1. In the second embodiment, however, the main control device 11, the receiving level detection device 4, the speech data storing device 15 and the speech synthesizing device 16 are adapted to detect the receiving level of the image data transmitted through the telephone line 2, convert the detected receiving level to a synthesized speech signal, and then transmit this synthesized speech signal to the opponent party.

More concretely, in the second embodiment, the speech data storing device 15 stores especially speech data corresponding to sentence such as "the receiving level is", as well as the data corresponding to numbers 0 to 9 such as "one" to "nine", and so on. The speech synthesizing device 16 synthesizes the speech signal on a basis of the data indicating the receiving level of the image data, which is detected by the receiving level detection device 4 and stored in the memory 8, and the speech data stored in the speech data storing device 15.

The display device 19 is also adapted to display especially the receiving level of the image data, as well as the operation mode of the facsimile apparatus 1, etc., as in the first embodiment.

Figure 5:
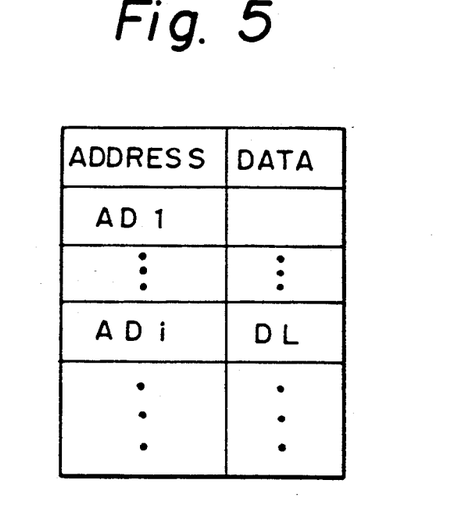
FIG. 5 is a schematic view showing another data structure in the memory of the facsimile apparatus of FIG. 1.

FIG. 5 shows another data structure of the stored content of the parameter storing region which is set in the memory 8 of FIG. 1. In the parameter storing region, addresses AD1 to ADi are set, while receiving level data DL indicating the receiving level of the image data, are stored in correspondence with these addresses. The other operation parameters may be stored together with the parameters DL.

Figure 6:
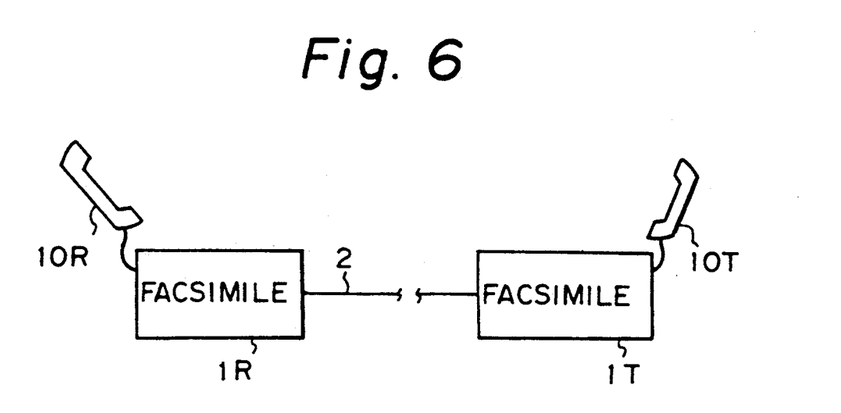
FIG. 6 is a schematic view to explain another operation of the facsimile apparatus of FIG. 1.

FIG. 6 is a schematic view to explain the basic operations of the second embodiment. In FIG. 6, 1R designates the facsimile apparatus at the receiving side, and 1T designates the facsimile apparatus at the transmitting side, each having the above described structure of FIG. 1 as the second embodiment, are connected with each other by the telephone line 2, via the telephone exchange (not shown).

In FIG. 6, the image data transmitted by the facsimile apparatus 1T is received by the facsimile apparatus 1R through the telephone line 2, and the receiving level data DL is stored into the memory 8 of the facsimile apparatus 1R. After receiving the image data, the facsimile apparatus 1R converts the stored receiving level data DL to a speech signal, and transmits the converted speech signal from the communication control device 3 to the facsimile apparatus 1T through the telephone line 2. At the facsimile apparatus 1T, the received speech signal is outputted from the handset 10T. By this output, the user at the site of the facsimile apparatus 1T can know the receiving level of the image data at the facsimile apparatus 1R. In FIG. 6 it is also shown that the facsimile apparatus 1R is equipped with the handset 10R to enable the voice communication therebetween.

The operation of the second embodiment will be explained hereinbelow, with referring to FIG. 1 and FIG. 7, which shows a flowchart of the receiving operation of the facsimile apparatus 1.

Figure 7:
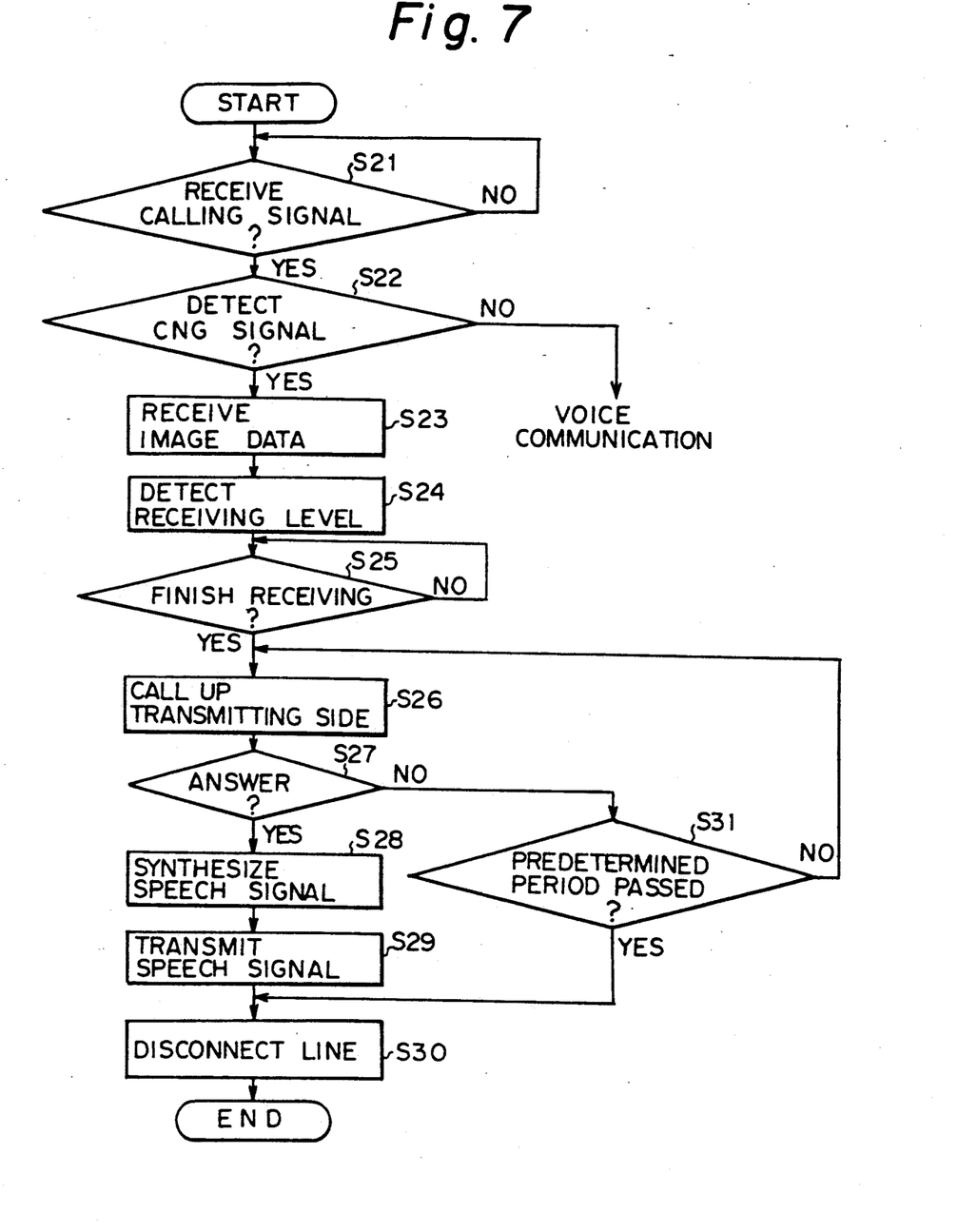
FIG. 7 is a flow chart showing another receiving operation of the facsimile apparatus of FIG. 1.

In FIG. 7, at the step S21, it is judged if the calling signal is received by the communication control device 3 or not, and this judgment is continued. If the calling signal is received (Yes), the flow goes to the step S22. At the step S22, it is judged by the main control device 11 if the CNG signal is detected or not. If the CNG signal is not detected (No), which means that the opponent party request the voice communication, the main control device 11 controls to drive the calling bell of the telephone 9, and then the user makes the voice communication by use of the handset 10.

If the CNG signal is detected at the step S22 (Yes), which means that the opponent party requests the facsimile communication, the flow branches to the step S23. At the step S23, the image data is received. Then, at the step S24, the receiving level of the image data is detected by the receiving level detection device 4 while receiving the image data, and is then stored to the memory 8, as the receiving level data DL at the address ADi as aforementioned.

At the step S25, it is judged if the reception of the image data is finished or not. When this reception of the image data is finished (Yes), the flow goes to the step S26. At the step S26, the facsimile apparatus 1 calls up the transmitting side facsimile apparatus. This calling up operation, may be performed by driving the calling bell of the telephone equipped in the transmitting side facsimile apparatus, or by generating an alarm sound from a speaker equipped in the transmitting side facsimile apparatus.

At the step S27, it is judged if there is an answer from the transmitting side facsimile apparatus or not, i.e. if the handset of the transmitting side facsimile apparatus is picked up by the user there or not. If there is the answer (Yes), the flow branches to the step S28. At the step S28, the receiving level data DL is read out from the memory 8, and the speech signal is synthesized. For example, such a speech signal is synthesized as "The receiving level is eight decibels.".

Then, at the step S29, the synthesized speech signal is transmitted from the communication control device 3 to the transmitting side facsimile apparatus through the telephone line 2. When the transmission of the speech signal is finished, the communication on the telephone line 2 is disconnected at the step S30, to end the receiving operation.

If there is no answer from the user of the transmitting side facsimile apparatus at the step S27 (No), the flow branches to the step S31. At the step S31, it is judged if the predetermined time period has passed or not after the starting time of the calling up operation. If the predetermined time period has not passed yet (No), the flow goes back to the step S26, and the calling up operation is continued. If the predetermined time period has passed (Yes) at the step S31, the flow branches to the step S30, and the communication on the telephone line 2 is disconnected to end the receiving operation.

The operation of the second embodiment will be continued hereinbelow, with referring to FIG. 1 and FIG. 8, which shows a flowchart of the transmitting operation of the facsimile apparatus 1.

Figure 8:
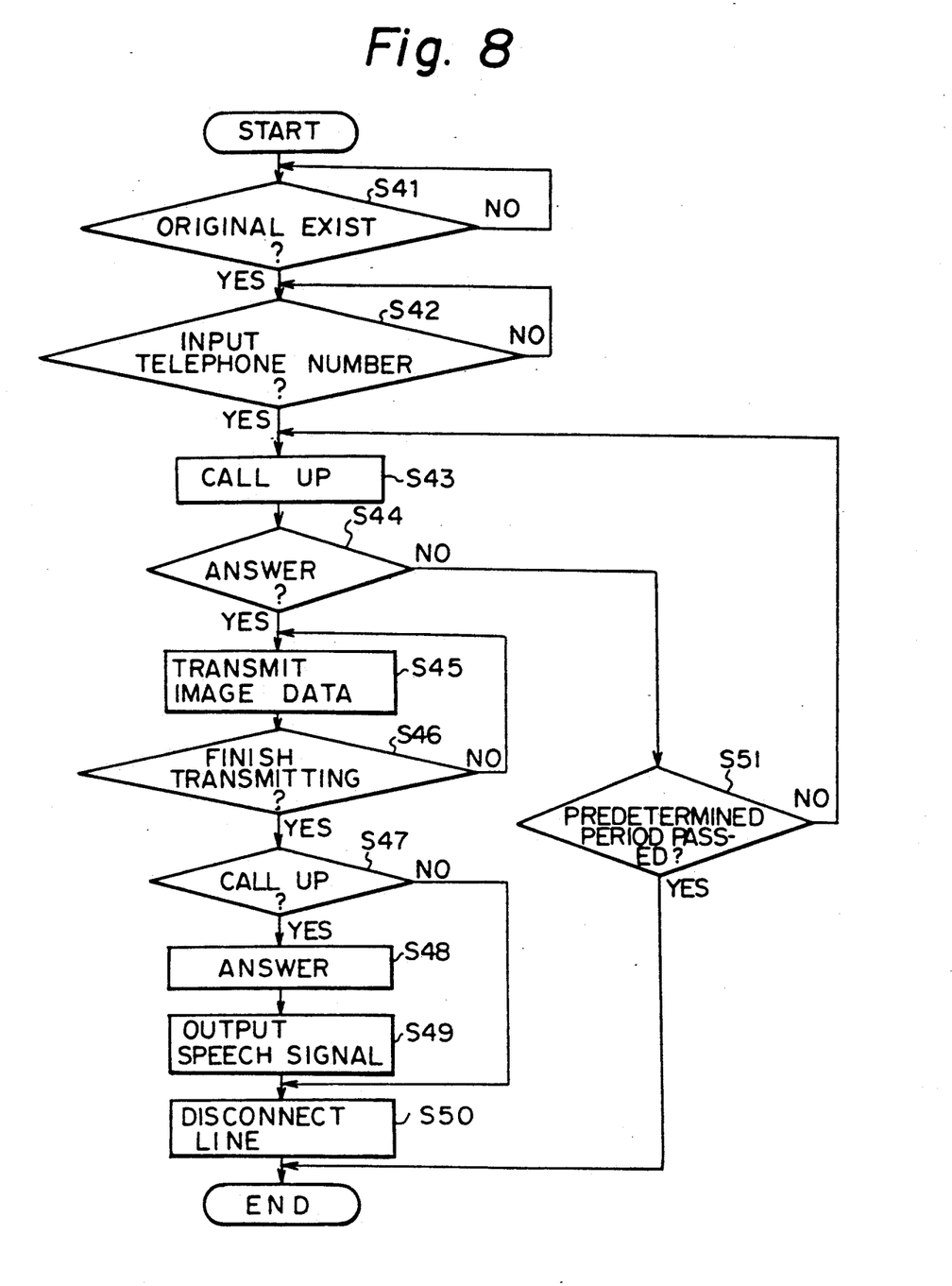
FIG. 8 is a flow chart showing a transmitting operation of the facsimile apparatus of FIG. 1.

In FIG. 8, at the step S41, it is judged if the original exists on a reading position of the reading device 12 or not, i.e. if the user at the transmitting side facsimile apparatus, sets the original to the reading device 12 or not. If there exists the original (Yes), the flow goes to the step S42. At the step S42, it is judged if the telephone number is inputted from the operating device 17 or not. When the telephone number is inputted (Yes), the flow goes to the step S43. At the step S43, the calling up operation is operated with respect to the called side facsimile apparatus at the destination corresponding to the inputted telephone number. Then, at the step S44, it is judged if there is an answer from the called side facsimile apparatus or not. If there is the answer from the called side (Yes), the flow branches to the step S45. At the step S45, the image data is transmitted. Then, at the step S46, it is judged if the transmission of the image data is finished or not. When the transmission of the image data is finished (Yes), the flow goes to the step S47.

At the step S47, it is judged if there is a calling up from the receiving side facsimile apparatus or not. The calling up operation from the receiving side facsimile apparatus, may be performed by driving a calling bell equipped in the telephone 9, or by generating an alarm sound from a speaker equipped in the facsimile apparatus 1. If there is the calling up (Yes), the flow branches to the step S48. At the step S48, the user of the facsimile apparatus 1 answers this calling up by picking up the handset 10.

At the step S49, the speech signal, which indicates the receiving level of the image data and which is transmitted from the receiving side facsimile apparatus, is outputted from the speaker of the handset 10. Then at the step S50, the communication on the telephone line 2 is disconnected to end the transmitting operation.

If there is no answer from the called side facsimile apparatus at the step S44, the flow branches to the step S51. At the step S51, it is judged if the predetermined time period has passed or not, after the starting time of the calling up operation of the step S43. If the predetermined time period has not passed yet (No), the flow goes back to the step S43, and the calling up operation is continued. If the predetermined time period has passed (Yes) at the step S51, the calling up operation is ended, and thus the transmitting operation is ended.

If there is no calling up from the receiving side facsimile apparatus at the step S47, the flow branches to the step S50, and the communication on the telephone line 2 is disconnected to end the transmitting operation.

As described above, according to the present embodiment, the receiving level of the image data at the receiving side facsimile apparatus is converted to the speech signal, and that, this converted speech signal is transmitted through the telephone line 2 to the transmitting side facsimile apparatus. Accordingly, the user at the transmitting side facsimile apparatus can know the receiving level of the image data by listening to the speech signal by use of the handset of the telephone. Thus, if the receiving level of the image data turned out to be too low, the user can make the output level of the transmitting side facsimile apparatus higher, so as to establish an appropriate receiving level of the image data. Consequently, according to the present embodiment, a certain image data transmitting and receiving operation is enabled, and the reliability of the facsimile apparatus 1 is drastically improved.

Many widely different embodiments of the present invention may be constricted without departing from the spirit and scope of the present invention. It should be understood that the present invention is not limited to the specific embodiments described in this specification, except as defined in the appended claims.

What is claimed is:

1. A facsimile apparatus for providing a facsimile communication with a communication device through a telephone line, comprising:
    a memory means for storing information to indicate an operating condition related to the facsimile communication;
    a voice data storing means for storing predetermined various kinds of voice data;
    a speech signal synthesizing means for synthesizing a speech signal based on the stored information and the stored voice data; and
    a communication control means for receiving image data from said communication device, and calling said communication device after receiving the image data and transmitting a predetermined speech signal synthesized by said speech signal synthesizing means based on said stored information onto said telephone line when said communication device answers with respect to the call within a predetermined period after a starting time of the call, said communication control means disconnecting the facsimile communication through said telephone line without transmission of said predetermined speech signal when said communication device does not answer with respect to the call in said predetermined period after said starting time of the call.

2. A facsimile apparatus according to claim 1, further comprising a parameter setting means for setting at least one operation parameter of said facsimile apparatus, wherein the information comprises information indicating the set operation parameter.

3. A facsimile apparatus according to claim 2, wherein said at least one operation parameter comprises at least one of a transmitting level of the image data, a transmitting ratio of the image data and an operation mode.

4. A facsimile apparatus according to claim 1, further comprising a receiving level detection means for detecting a receiving level of the image data received by said facsimile apparatus through said telephone line, wherein the information stored in said memory means comprises information indicating the detected receiving level.

5. A facsimile apparatus according to claim 1, further comprising a control means for controlling operations of said memory means, said voice data storing means, said speech signal synthesizing means and said communication control means.

6. A facsimile apparatus according to claim 1, further comprising a telephone to perform a voice communication through said telephone line.

7. A facsimile apparatus for providing a facsimile communication with a communication device through a telephone line, comprising:
    a parameter setting means for setting at least one operation parameter of the facsimile communication;
    a receiving level detection means for detecting a receiving level of an image data received by said facsimile apparatus through said telephone line;
    a memory means for storing information to indicate the set operation parameter and the detected receiving level;

a voice data storing means for storing predetermined various kinds of voice data;

a speech signal synthesizing means for synthesizing a speech signal based on the stored information and the stored voice data; and a communication control means for receiving image data from said communication device, and calling said communication device after receiving the image data and transmitting a predetermined speech signal synthesized by said speech signal synthesizing means based on said stored information onto said telephone line when said communication device answers with respect to the call within a predetermined period after a starting time of the call, said communication control means disconnecting the facsimile communication through said telephone line without transmission of said predetermined speech signal when said communication device does not answer with respect to the call in said predetermined period after said starting time of the call.

* * * * *